(12) United States Patent
Evans, IV

(10) Patent No.: US 6,525,831 B1
(45) Date of Patent: Feb. 25, 2003

(54) NON-FORMAT VIOLATING PDL GUESSING TECHNIQUE TO DETERMINE THE PAGE DESCRIPTION LANGUAGE IN WHICH A PRINT JOB IS WRITTEN

(75) Inventor: Charles H. Evans, IV, Manhattan Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/283,132

(22) Filed: Mar. 31, 1999

Related U.S. Application Data

(63) Continuation-in-part of application No. 09/204,757, filed on Dec. 2, 1998.

(51) Int. Cl.[7] ............................................... G06K 15/00
(52) U.S. Cl. ...................................... 358/1.15; 358/1.1
(58) Field of Search ........................ 358/1.1, 1.9, 1.12, 358/1.13, 1.14

(56) References Cited

U.S. PATENT DOCUMENTS

| | | | | |
|---|---|---|---|---|
| 5,287,194 A | * | 2/1994 | Lobiondo | 358/296 |
| 5,402,527 A | * | 3/1995 | Bigdy et al. | 358/1.8 |
| 5,559,933 A | * | 9/1996 | Boswell | 358/1.15 |
| 5,671,341 A | * | 9/1997 | Kashiwazaki et al. | 358/1.15 |
| 5,748,860 A | * | 5/1998 | Shively | 358/1.15 |
| 5,845,058 A | * | 12/1998 | Shaw et al. | 358/1.15 |
| 5,898,821 A | * | 4/1999 | Brandkamp | 358/1.9 |
| 5,978,560 A | * | 11/1999 | Tan et al. | 358/1.15 |
| 5,978,563 A | * | 11/1999 | Kawamoto et al. | 358/1.18 |

\* cited by examiner

*Primary Examiner*—Gabriel Garcia
(74) *Attorney, Agent, or Firm*—Philip T. Virga; Bill Propp

(57) ABSTRACT

A printing system produces prints from a print job written in one of a plurality of page description languages with the print job assuming the form of a print job stream. The printing system includes a page description language guesser having a plurality of page description language analyzing units for sampling the print job stream, each analyzing unit outputting an information signal which provides information regarding the print job stream. The PDL guesser, which receives the information signals, processes the information signals and outputs a filtered signal which indicates the page description language in which the print job is written. The page description language (PDL) analyzing unit verifies that in the data sample all command operator strings, their associated parameters and interspersed data are valid for a particular PDL or Image Format.

8 Claims, 3 Drawing Sheets

NON-FORMAT VIOLATING PDL GUESSING TECHNIQUE TO DETERMINE THE PAGE DESCRIPTION LANGUAGE IN WHICH A PRINT JOB IS WRITTEN

This application is a continuation-in-part of application Ser. No. 09/204,757, filed Dec. 2, 1998.

BACKGROUND OF THE INVENTION

This invention is a continuation-in-part of U.S. patent application Ser. No. 09/204,757, filed Dec. 2, 1998, status pending.

The present invention relates to interpreting jobs written in a plurality of page description languages for printing with a printing apparatus and, more particularly, to a page description language (PDL) guesser which facilitates the interpretation of a print job written in a page description language by determining the page description language in which the print job is written.

Enterprise print management systems provide the means to control and access various printers and to manage other related information remotely.

There are print servers that use a single document manager based on the protocol of DPA ISO 10175 which streamline document processing and allow for minimization of UMC. Examples of such servers may be found in products made available by Xerox Corporation under the "Document Centre" product name.

The enterprise print service will preferably employ an implementation known as the ISO document processing architecture (DPA) standard as envisioned by ISO/IEC 10175. The DPA print system is based on a two level client-server model. Both print spooler and printer supervisor act as servers.

A print client is a client acting as the user's agent that accepts commands, submits requests to print services, receives responses, generates per-user local job numbers, and remembers for each user where the jobs have been submitted. A print spooler is a server that accepts operations from print clients and schedules print jobs on its printer supervisors.

A printer supervisor accepts requests from clients (print spoolers) to print a job on one of possibly several physical printers.

A physical printer represents an actual piece of printing hardware that is either directly or remotely connected to a printer supervisor. A queue contains jobs waiting to be printed. When a physical printer finishes or nearly finishes a job, its printer supervisor indicates to the spooler its readiness to accept another print job. The spooler scans the queue that feeds the physical printer and a scheduling algorithm selects the next job and assigns that job to that physical printer by submitting the print job to the print supervisor using an ISO DPA Print operation.

A logical printer is the abstract entity that users specify to indicate where their job is to be printed and/or what characteristics their job has. Each logical printer has default attributes that the server supplies for those attributes that neither the user nor his print client has supplied. The spooler may assign a print job to the queue based on the specified logical printer, depending on the scheduling policy as established by its system administrator. In other words, a logical printer feeds one queue; each queue feeds one or more physical printers as established by the system administrator of the spooler.

A page description language (PDL) is a method of describing printed pages in a printer independent format. A PDL establishes as interface between a print driver or client and a print server or printer. No one standard PDL presently exists, and as a result a number of industry a standards have emerged. Currently existing PDL standards include PostScript.RTM. ("PS"), Hewlett Packard Printer Control Language ("HP-PCL") and Interpress Page Description Language.

The well-known commercially-available PDLs, such as PostScript and HP-PCL, relate mainly to the construction of various typefaces for characters and numerals. There are other conventions for organizing image data independent of any typefaces therein. These "image formats" include TIFF, CALS, as well as those image formats which are associated with facsimile transmission, such as CCITT fax Group 3 and fax Group 4. Image formats are a system of "shorthand" commands which enable raw image data (i.e., a set of binary numbers corresponding to black and white pixels) to be compressed into a more manageable form. To take one basic example, an image format such as TIFF or CALS may include an instruction within a data set corresponding to "print a white line" in lieu of a long string of numbers (such as zeros), each number corresponding to one individual pixel in the white line. In this way, image data may be retained in smaller memory spaces than would be required if every single pixel in an image had its own bit of memory. As used herein, the term "image data" shall apply to image data in either image format or PDL, and an "image data set" shall mean a meaningful quantity of such data, such as data for an image or a connected series of images.

With any PDL or image format, there will inevitably be a step of translation of the PDL or image format data into a form usable by an output device, such as a printer. Printing hardware requires an input stream of binary data. Thus, the instructions within the image format, such as to "print a white line," will eventually have to be translated into the actual binary code. This code can then be applied to the modulation of a laser source in a raster output scanner, or applied sequentially to individual ejectors in an ink-jet printer.

A PDL Guesser is a software algorithm that determines the page description language (PDL) or Image Format in which a print job is written by analyzing a sample of the data. The PDL Guesser is essential to an electronic print system since it shall determine if the system can print a specific job that it receives. Once a PDL Guesser in an electronic print system determines the PDL or Image Format of a print job, the print system can determine if it supports the PDL or Image Format.

Prior art guessing techniques to determine the PDL or Image Format include looking for specific character strings at the beginning of a very small portion of the image data, as taught in U.S. Pat. No. 5,526,469, commonly assigned as the present application and herein incorporated by reference. Another prior art PDL guesser looks for a specific command instruction at the beginning of each print job or recognizes unique command instructions that act as telltale signs, as described in U.S. Pat. No. 5,493,635, commonly assigned as the present application and herein incorporated by reference. One prior art guesser recognizes a PDL or Inage Format by its "signature" string or by the frequency of the occurrence of certain "operators", as explained in U.S. Pat. No. 5,402,527, commonly assigned as the present application and herein incorporated by reference. Yet another prior art PDL guesser utilizes statistical analysis to recognize a PDL or Image Format, as detailed in U.S. Pat. No. 5,293,466, herein incorporated by reference.

These prior art PDL Guessing techniques may not be sufficient for certain PDLs and Image Formats. The PDL or Image Format may not have an identified "signature" string which must be present in every print job. There may not be a representative sample of command operators that can be guaranteed to exist in every print job. The frequencies of occurrence of certain PDL or Image Format command operator strings may not be able to be guaranteed across all print jobs. The PDL or Image Format may not lend itself to statistical analysis since no characteristic sequences may occur in a significant portion of the print job samples.

It is an object of the present invention to provide a new type of PDL guesser for PDL and Image formats.

SUMMARY OF THE INVENTION

According to the present invention, a printing system produces prints from a print job written in one of a plurality of page description languages with the print job assuming the form of a print job stream. The printing system includes a page description language guesser having a plurality of page description language analyzing units for sampling the print job stream, each analyzing unit outputting an information signal which provides information regarding the print job stream. The PDL guesser, which receives the information signals, processes the information signals and outputs a filtered signal which indicates the page description language in which the print job is written.

The page description language (PDL) analyzing unit verifies that in the data sample all command operator strings, their associated parameters and interspersed data are valid for a particular PDL or Image Format.

Other objects and attainments together with a fuller understanding of the invention will become apparent and appreciated by referring to the following description and claims taken in conjunction with the accompanying drawings.

DESCRIPTION OF THE INVENTION

Figure 1:
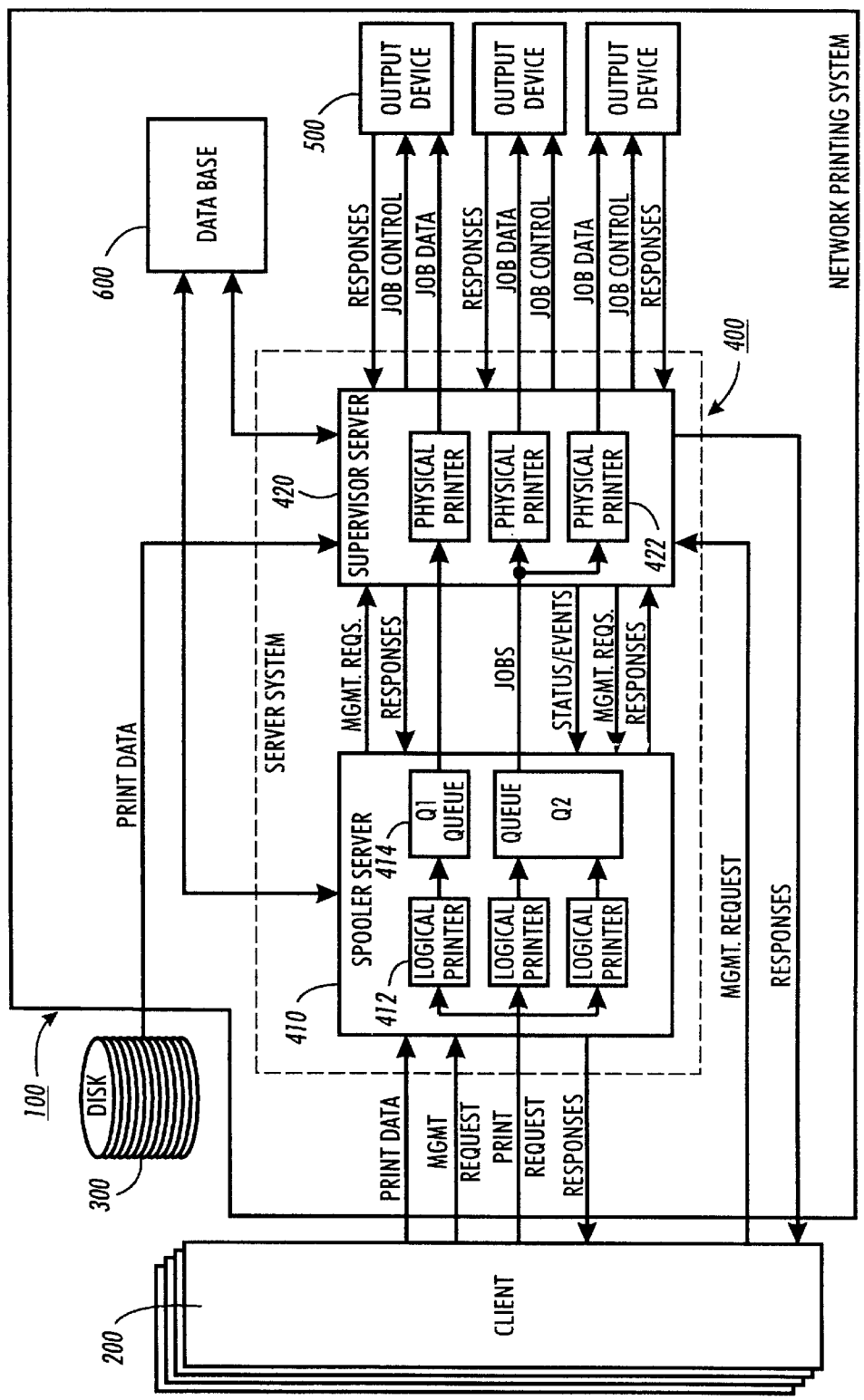
FIG. 1 is a schematic block diagram of the distributed printing system of the present invention.

Reference is now made to FIG. 1 illustrating the architecture of a client/server distributed printing system 100 of the present invention. The printing system 100 includes one or more clients 200, a general purpose computer system 400, which in this invention is preferably a server system, one or more output devices 500, a disk 300 and an attribute database 600. Each client 200 initiates print requests to print a specified file or files containing print data, and initiates management requests to manage printing systems, such as adding or deleting printers, canceling print requests and the like. The print data can include text or images created by an end user.

The server 400 receives print requests from the clients 200, either directly or via any other source of print requests, such as storage disk 300. The print requests include print data for one or more documents as well as printing instructions, i.e. simplex or duplex printing, stapling or binding, multiple copies, paper size and orientation, etcetera. The server 400 performs actions required for each request operation and returns responses to the corresponding client 200. The server 400 organizes documents into print jobs. A document represents a single user file that is to be printed. A print job represents a collection of one or more documents that are printed as a unit. The print job includes instructions for printing (such as production and finishing), event notification, and response delivery. The server 400 also is responsible for sending job data and associated job control commands to the output device 500.

Each output device 500 is a physical device or hardware that is capable of rendering images, text or documents to produce a hard copy output of the print jobs received from the server 400. Depending on the type of output device 500 and/or the settings of its particular features, each output device 500 returns responses to the server 400 indicating, for example, its current state. Output devices 500 can include, but are not limited to, printers, facsimile machines or pagers. However, as a non-limiting example, this disclosure refers to the output devices 500 as printers, for simplicity.

In a preferred system, implemented on a general purpose computer, the server functions are split between two different server types, a spooler server 410 and a supervisor server 420. Additionally, such a printing system supports two types of output devices: logical printers 412 (LP1, LP2 and LP3) and physical printers 422 (PP1 and PP2).

In general, a spooler 410 takes print requests from multiple clients 200, converts the print requests into print jobs, schedules print jobs based on the print requests and then forwards the print jobs to a supervisor 420. The supervisor 420 provides the common interface between the spooler 410 and the output devices 500. The supervisor 420 takes the print jobs from the spooler 410 and invokes the designated printer to render the data.

The spooler 410 receives a client print request for a print job that specifies a particular logical printer. The spooler 410 then schedules the print job on an appropriate physical printer 422 associated with the specified logical printer 412. At an appropriate time, the spooler 410 forwards the print job to the supervisor 420 associated with the physical printer 422 on which the spooler 420 scheduled the print job. The spooler 410 can support multiple supervisors 420. The supervisor server 420 delivers data to one or more of the output devices 500. The supervisor 420 receives the print jobs from the spooler 410, interprets the print jobs for print instructions and parameters, passes the print data, instructions and parameters to the appropriate output device 500, and handles any responses made by the output device 500.

The supervisor 420 receives client management requests that apply to print jobs forwarded to the supervisor, including those print jobs forwarded further to one of the output devices 500. The supervisor 420 also sends management requests to the spooler 410, such as, for example, a request for next job, and status updates, such as "job completed." The supervisor 420 also notifies the spooler 410 of events, such as canceling a print job in response to a "Job Cancel" management request from a user.

A logical printer 412 indicates particular characteristics and capabilities of one or more of it associated physical printers 422. The logical printers 412 are an abstraction of the printer capability of the network printing system 100. Each physical printer 422 represents one actual output device 500 connected to the network printing system 100. Attributes of the logical printers 412 and the physical printers 422 are stored on a database 600 associated with the network printing system 100. The printer attributes correspond to the print job attributes that are extracted from print requests. With regard to the print job, the attributes represent requirements of the print request. With regard to the printers, the attributes represent the print capabilities of the printers.

In a preferred embodiment of this invention, the database 600 resides on the server 400. However, it can be appreciated that the database 600 does not need to reside on the server 400, but can be resident on any device that is accessible by the server 400.

Print jobs are submitted to the logical printers 412 to determine which characteristics are associated with the print job, such as A4 paper, highlight color, and/or stapled output. The spooler 410 channels the print jobs via a queue 414 to the particular supervisor 420 that supports a physical printer.422 that is mapped to a logical printer 412 through the queue 414.

The queue 414 associates a set of print jobs with a set of logical printers 412 and a set of physical printers 422. The one or more queues 414 serve as a holding station for the print jobs until the spooler 410 can send them to the appropriate supervisor 420. Logical printers 412 feed print jobs into the queue 414 and the physical printers 422 request print jobs from the queue.

Figure 2:
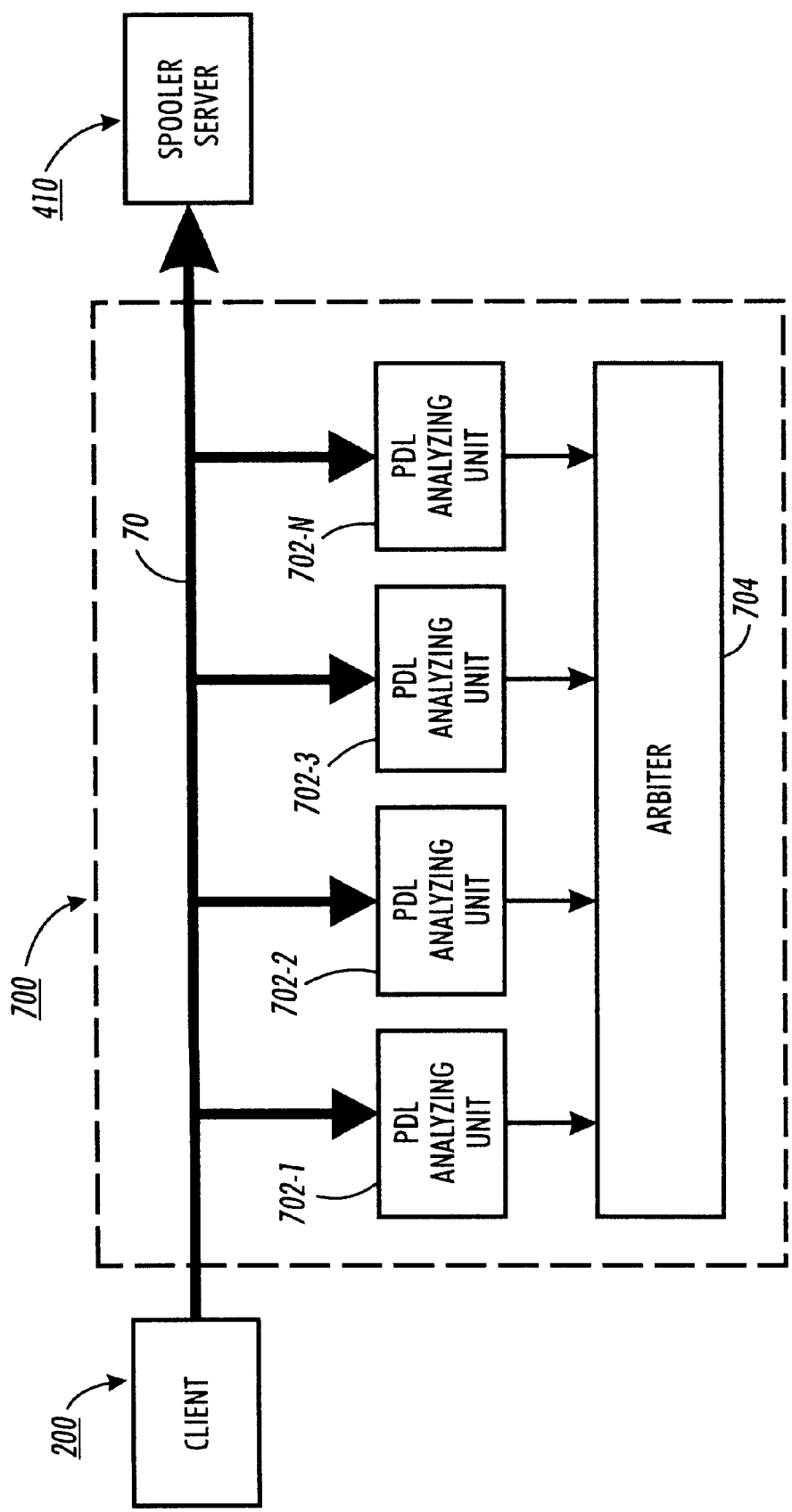
FIG. 2 is a schematic block diagram depicting an arrangement for the page description language (PDL) guesser of the present invention to analyze a print job stream and determine the page description language in which the corresponding print job is written.

Referring to FIG. 2, a PDL guesser 700 determines the PDL of a print job, transmitted from one of the clients 200 to the spooler 410. In the illustrated embodiment of FIG. 2, the content of one of the network buses 70, i.e. the content of a print job stream, is scanned by various PDL analyzing units 702-1, 702-2, 702-3, . . . 702-N (hereinafter referred to conjunctively as "PDL analyzing units 702").

As is known, each print job assumes the form of a stream which is expressed in a PDL, the PDL representing image data and instructions for the print job. In the preferred embodiment, each PDL analyzing unit is capable of analyzing one PDL type. However, the PDL guesser with multiple analyzing units can analyze more than one PDL type and a single PDL guesser could be capable of analyzing all the PDL types. The PDL types may comprise, among others, PCL, PS, Interpress and TIFF. Preferably, one of the PDL analyzing units 702 is a binary filter which is used in conjunction with an arbiter, as explained in further detail below. As will be appreciated by those skilled in the art, the PDL analyzing units comprise a modular system and units can be added or deleted in accordance with the demands of the printing system 100.

For convenience of discussion, the PDL guesser 700 is shown with only one of network buses 70, but, in practice, the guesser arrangement 700 would be used with multiple buses. Additionally, the guesser arrangement 700 is shown as a multi-tasking model in which the stream is sampled in parallel, but in other embodiments, the stream could be sampled with a pipeline model, i.e. in sequence, without affecting the concept upon which the disclosed embodiment is based. Finally, while the guesser arrangement 700 is part of the spooler 410, the guesser arrangement 700 could be a service separate from the spooler 410.

In one preferred embodiment, each of the PDL analyzing units is a processor upon which software, suitable for analyzing the print job stream, is implemented. In another embodiment, the PDL analyzing units could be implemented in a multi-tasking system. As the print job stream is analyzed by the units 702, they transmit information signals $I_0$, $I_1$, $I_2$, . . . $I_N$, respectively, to an arbiter 704.

In one example, the arbiter (or "best guess arbiter") is a logical device or redundancy filter which is adapted to resolve ambiguities and set precedents. The arbiter 704 is programmable. In the preferred embodiment, the arbiter communicates with various inputs other than the information signals. The primary purpose of the arbiter is to process the information signals for outputting a signal from the analyzing units of the guesser for outputting a signal indicating the PDL of the print job stream. As shown in FIG. 2, that output signal is transmitted from the arbiter 704 to the spooler 410.

For the purposes of PDL analyzing, a PDL or Image Format is considered to consist only of the defined command operator strings and the specified number of parameters associated therewith. The command operator strings are interspersed with data in a print job. The PDL analysis of the present application is known as the Non-Format Violating Guessing technique. The guesser does not violate the PDL or Image Format of the data sample. Non-Format Violating Guessing verifies that in the data sample all command operator strings, their associated parameters and interspersed data are valid for a particular PDL or Image Format.

The Non-Format Violating Guessing PDL analyzing unit first identifies all command operator strings for that specific page description language. Next, the set of parameters (if any) are identified for each command operator string. Parameter designators are then assigned by the PDL analyzing unit to characterize the parameters.

Parameter designators can be assigned in several ways. One method is to determine each unique set of parameters for the command operator strings. Two command operator strings are assigned the same parameter designator if they have the same parameters in the exact same order. A second method is to determine how parameters are going to be handled. For instance, if parameters of type text are going to be handled the same as numbers, then one parameter designator can represent both. Another parameter designator could be assigned to handle interspersed data. This second method is useful when the parameters are not actually going to be verified, but must be passed over to get to the next command operator string. At this point, each command operator string has assigned to it a parameter designator which uniquely describes the parameters. The PDL analyzing unit has a table which contains each command operator string and its parameter designator for that specific page description language (PDL).

The table represents every command operator string and its parameters which exists in that specific PDL or Image Format. The table can take one of many forms. It could be read in from a file. It could be hard-coded into the PDL analyzing unit.

A handler function or functions is developed for each parameter designator which shall handle the processing of the parameters. The handler may actually verify the validity of each parameter or it may simply skip the parameters.

Figure 3:
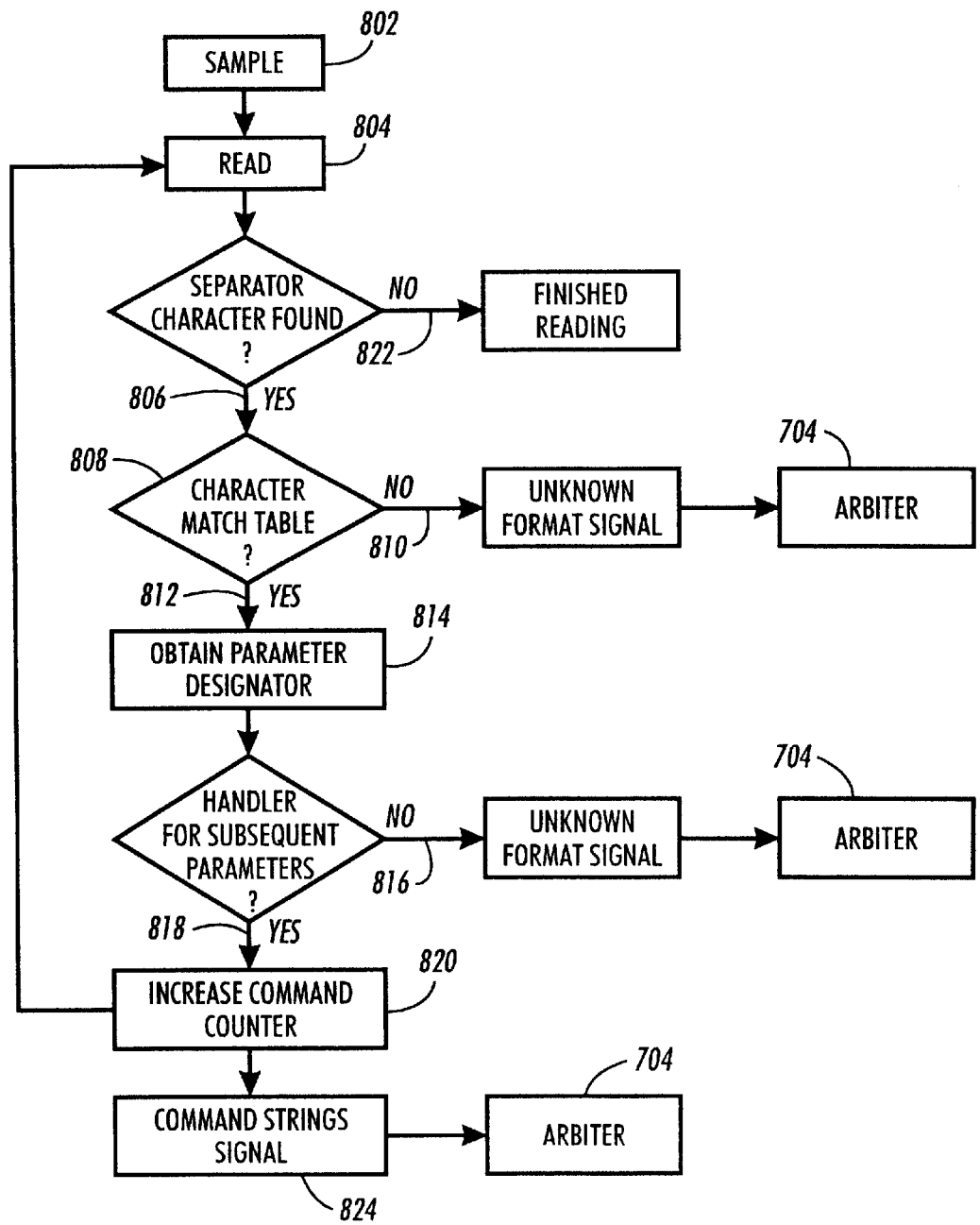
FIG. 3 is a flow diagram illustrating the steps of the page description language (PDL) analyzing unit of FIG. 2 in analyzing the print job stream and determining the page description language in which the corresponding print job is written.

Referring to FIG. 3, the steps of the PDL guessing analyzing unit of the present application are provided. The print job stream in initial step 800 is communicated to the PDL analyzing units 702.

As the process proceeds to step 802, the PDL analyzing units sample the print job stream. In the next step 804, the PDL analyzing units read a character from the sample.

A separator character is one that designates the end of a command operator string or parameter in the PDL or Image Format.

The PDL analyzing units then determine whether the character read is a separator character in step 806.

If the character read by the PDL analyzing units is not a separator character, then the character is stored in a buffer in step 808. The buffer holds the other non-separator characters since the last separator character was read. The PDL analyzing units will then read the next character from the sample in step 804.

If the character read by the PDL analyzing units is a separator character, the PDL analyzing units will then match the string of non-separator characters in the buffer from the sample to each command operator string in the PDL or Image Format table in the next step 810.

If the non-separator character string in the buffer from the sample does not match any of the command operator strings in the table, then the character string from the sample is not a valid command operator string for the PDL or Image formats in the table for that PDL. The analyzing unit will send an unknown format signal in step 812 to the arbiter 704.

If the character string from the buffer does match one of the command operator strings in the table, then the character string is a valid command operator string for that specific PDL or Image format. The analyzing unit will then obtain the corresponding parameter designator from the table for that valid command operator string as shown in step 814.

The analyzing unit then invokes the handler function in step 816 for that parameter designator to handle the subsequent parameters in the sample of the document data. The analyzing unit then reads the rest of the characters from the sample to determine if the handler function can handle the subsequent parameters in the sample in step 818.

If the handler function is unable to handle the subsequent parameters in the sample, then the character string from the sample is not a valid command operator string for the PDL or Image format. The analyzing unit will send an unknown format signal in step 820 to the arbiter 704.

If the handler function is able to handle the subsequent parameters in the sample in step 822, then the character string from the sample is a valid command operator string for the PDL or Image format. The analyzing unit in step 822 will then increment the command operator string counter by one to designate a valid command operator string for that sample.

The analyzing unit will return to continue reading in step 804 and processing the characters from the sample until the end of the data.

If there are no more characters in the sample to be read, then no separator character will be found in step 806. Between step 806 and storing the non-separator character in step 808, the PDL analyzing unit will determine if it has reached the end of the data sample in step 824.

If there is a non-separator character, then the end of the data has not been reached and the character will be stored in a buffer in step 808.

If there are no more characters in the sample to be read, then the end of the data sample has been reached. The PDL analyzing unit will then determine what number is in the command operator string counter in step 826.

If the command operator string counter is 0, then the analyzing unit has not determined the PDL or Image Format for that sample and will send an unknown format signal in step 828 to the arbiter 704.

If the command operator string counter is greater than or equal to 1, then the analyzing unit has determined the PDL or Image Format for that sample in step 830 and will send the format signal to the arbiter 704.

When a valid command operator string is found, a corresponding information signal is generated, at step 830.

Each of the information signals generated by the PDL analyzing units 702 within one PDL guesser 700 are outputted and the information signals are transmitted to the arbiter 704 of that PDL guesser. Each of the signals are then arbitrated, conjunctively, with the arbiter 704. The arbiter, in the preferred embodiment, operates by a set of rules, which may be hard-coded or may be programmed dynamically through use of a configuration file. Preferably, the configuration file assumes a hierarchical form of the type shown in U.S. Pat. No. 5,467,434, commonly assigned as the present application and herein incorporated by reference.

Since the configuration file is programmable, the arbiter can be altered readily in conformance with the needs of various clients. In one example, rules are dynamically reconfigured through use of the server rules line or the client server lines. A client user or a server administrator can display the current rules on an appropriate display and selected rules can be deleted and replaced with other desired rules. Through use of the rules inputs, the client user or server administrator may set printing priorities and/or precedents.

Through the use of over-ride signals, either the client user or the server administrator can direct arbiter operation to correspond with various existing conditions of the printing system.

As mentioned above, one of the PDL analyzing units may include a binary filter which collects statistics regarding the occurrence of binary characters in the print job stream. This prevents a data stream from fooling the guesser arrangement 700 into reporting that a print job is written in one PDL when it happens to include an executable image that simply contains valid PDL operators or keywords. The arbiter 704 uses the binary filter's knowledge of the print job stream to prevent it from reporting that PDL when the print job stream contains fewer than a selected percentage of binary characters.

After the information signals have been arbitrated with the arbiter 704, the resulting arbitrated signal, indicating the PDL of the print job stream, is transmitted to the spooler 410. The spooler uses this information to insure that the appropriate PDL interpreter resides in the logical printer and the actual printer.

Numerous features of the present disclosed embodiment will be appreciated by those skilled in the art:

One feature of the disclosed embodiment is efficient PDL analyzing of a print job stream. That is, a print job stream is scanned simultaneously by a plurality of PDL analyzing units, and each of the units is able to provide information simultaneously about the PDL type embodied by the stream. Moreover, the PDL analyzing units can provide information regarding the presence of a PDL version type in the print job stream.

Another feature of the disclosed embodiment is flexibility and extendibility. That is, PDL analyzing units can be added and deleted as desired in a modular fashion. To accommodate for such addition(s) or deletion(s) an arbiter, which is used to filter the outputs of the PDL analyzing units, can be provided with a programmable, configuration file.

Yet another feature of the disclosed embodiment is tunability of the arbiter. The arbiter communicates with various inputs, which inputs can be used to program the arbiter dynamically. Moreover, the inputs permit the arbiter to be over-ridden by either a client user or a server administrator.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A printing system that distributes documents among a plurality of printers in a networked printing system comprising:

a spooler that receives documents and generates a print job from each document, a page description language guesser having a plurality of page description language analyzing units on said spooler, said plurality of page description language analyzing units for sampling a data sample from said document, said data sample including command operator strings of a page description language in which said print job is written, wherein said plurality of said page description language analyzing units analyze said data sample for said command operator strings to determine said page description language, and a supervisor for forwarding said print job of said document from said spooler to one of said plurality of printers for printing said document which can print said page description language of said print job of said document wherein said plurality of said page description language analyzing units match said command operator string from said data sample against a table of parameters and corresponding parameter designators for said page description language.

2. The printing system that distributes documents among a plurality of printers in a networked printing system of claim 1 wherein each of said page description language analyzing units outputs a signal regarding the page description language of said data sample from said document, and further comprising, an arbiter for receiving and processing said signals from said plurality of page description language analyzing units, said arbiter determining the page description language of said document.

3. The printing system that distributes documents among a plurality of printers in a networked printing system of claim 2 further comprising a binary filter for providing said arbiter with an indication of a percentage of binary characters in said print job to prevent erroneously indicating that said print job is written predominantly in one page description language when it is written predominantly in another page description language.

4. The printing system that distributes documents among a plurality of printers in a networked printing system of claim 1 further comprising a queue that stores said print job until said spooler can forward said print job to said supervisor.

5. A method for distributing document printing among a plurality of printers in a networked printing system comprising:

receiving documents at the networked printing system, generating a print job from each document by a spooler, sampling a data sample from said document, analyzing said data sample by a page description language guesser having a plurality of page description language analyzing units for a command operator string of a page description language to determine said page description language, and forwarding said print job of said document to one of said plurality of printers for printing said document which can print said page description language of said print job of said document by a supervisor wherein said plurality of said page description language analyzing units match said command operator string from said data sample against a table of parameters and corresponding parameter designators for said page description language.

6. The method for distributing document printing among a plurality of printers in a networked printing system of claim 5 wherein said analyzing said data sample includes receiving and processing signals from said plurality of page description language analyzing units by an arbiter, said arbiter determining the page description language of said document and setting an attribute for said document to indicate the page description language for said print job of said document.

7. The method for distributing document printing among a plurality of printers in a networked printing system of claim 6 wherein said determining the page description language includes providing said arbiter with an indication of a percentage of binary characters in said print job to prevent erroneously indicating that said print job is written predominantly in one page description language when it is written predominantly in another page description language.

8. The method for distributing document printing among a plurality of printers in a networked printing system of claim 5 further comprising storing said print job in a queue until said spooler can forward said print job to said supervisor.

* * * * *